US010065348B2

(12) United States Patent
Engelmann et al.

(10) Patent No.: US 10,065,348 B2
(45) Date of Patent: Sep. 4, 2018

(54) INJECTION-MOLDING MACHINE

(71) Applicant: Ferromatik Milacron GmbH, Malterdingen (DE)

(72) Inventors: Sven Engelmann, Rot am See (DE); Rüdiger Saum, Denzlingen (DE); Thorsten Thümen, Bensheim (DE)

(73) Assignee: FERROMATIK MILACRON GMBH, Malterdingen (DE)

( * ) Notice: Subject to any disclaimer, the term of this patent is extended or adjusted under 35 U.S.C. 154(b) by 228 days.

(21) Appl. No.: 14/746,101

(22) Filed: Jun. 22, 2015

(65) Prior Publication Data

US 2015/0283741 A1    Oct. 8, 2015

Related U.S. Application Data

(63) Continuation of application No. PCT/EP2013/003637, filed on Dec. 3, 2013.

(30) Foreign Application Priority Data

Dec. 21, 2012  (DE) .................... 10 2012 025 132

(51) Int. Cl.
*B29C 45/26* (2006.01)
*B29C 45/16* (2006.01)
(Continued)

(52) U.S. Cl.
CPC .......... *B29C 45/1635* (2013.01); *B29C 45/13* (2013.01); *B29C 45/14311* (2013.01);
(Continued)

(58) Field of Classification Search
None
See application file for complete search history.

(56) References Cited

U.S. PATENT DOCUMENTS 2,333,059 A * 10/1943 Tucker ................. B29C 45/062
264/161
4,885,121 A * 12/1989 Patel ................... B29C 45/1615
264/246
(Continued)

FOREIGN PATENT DOCUMENTS

DE        40 92 623 T1    12/1992
DE        43 28 853 C1     1/1995
(Continued)

OTHER PUBLICATIONS

International Search Report issued for International Patent Application No. PCT/EP2013/003637 dated Jul. 3, 2014.

*Primary Examiner* — Edmund Lee
(74) *Attorney, Agent, or Firm* — Myers Wolin, LLC

(57) ABSTRACT

The production of a plastic molded part utilizes a barrier layer embedded in plastic. Plastic is injection-molded successively in different cavities of the injection mold onto a three-dimensional preform made from a cut of a multi-layer barrier film, which multi-layer barrier film comprises a barrier layer coated with plastic on both sides. The plastic coating of the barrier film cut is at least superficially melted by the injected plastic melt. And the preform is supported by a support formed on the corresponding partial mold on the respective opposite side.

8 Claims, 2 Drawing Sheets

(51) Int. Cl.
  *B29C 45/13* (2006.01)
  *B29C 45/14* (2006.01)
  *B29C 45/00* (2006.01)
  *B29K 101/12* (2006.01)

(52) U.S. Cl.
  CPC ........ B29C 45/162 (2013.01); B29C 45/1671 (2013.01); *B29C 45/14778* (2013.01); *B29C 45/2681* (2013.01); *B29C 2045/0089* (2013.01); *B29C 2045/14319* (2013.01); *B29C 2045/1637* (2013.01); *B29K 2101/12* (2013.01); *B29K 2623/086* (2013.01); *B29K 2995/0067* (2013.01)

(56) References Cited

U.S. PATENT DOCUMENTS

| | | | |
|---|---|---|---|
| 5,651,998 A | 7/1997 | Bertschi et al. | |
| 6,468,458 B1* | 10/2002 | Anderson | B29C 45/0013 264/245 |
| 7,210,917 B2* | 5/2007 | Lai | B29C 45/1615 264/255 |
| 7,517,207 B2* | 4/2009 | Tsai | B29C 45/5605 425/190 |
| 8,408,890 B2* | 4/2013 | Fukumoto | B29C 45/045 264/250 |
| 2004/0119200 A1* | 6/2004 | Gram | B29C 45/062 264/255 |

FOREIGN PATENT DOCUMENTS

| | | |
|---|---|---|
| DE | 10 2006 054 264 A1 | 5/2008 |
| EP | 1 612 024 A1 | 1/2006 |
| EP | 1 886 787 A1 | 2/2008 |
| WO | 96/07525 A1 | 3/1996 |
| WO | 2009/143600 A1 | 12/2009 |
| WO | 2010/050101 A1 | 5/2010 |

\* cited by examiner

INJECTION-MOLDING MACHINE

CROSS REFERENCE TO RELATED APPLICATIONS

This application is a continuation under 35 U.S.C. § 120 of International Application PCT/EP2013/003637, filed Dec. 3, 2013, which claims priority to German Application 10 2012 025 132.7, filed Dec. 21, 2012, the contents of each of which are incorporated by reference herein.

FIELD OF THE INVENTION

The present invention relates to a method for producing a plastic molded part, which has a barrier layer embedded in the plastic. It furthermore relates to an injection-molding machine.

BACKGROUND

The injection-molding technique is one of the most important methods in plastics processing. It comprises countless variants of the production of solid or hollow products composed of one component or multiple components, with or without a prefinished insertion part.

EP 1612024 A1 discloses a method for producing a composite component, which has a carrier component and a cover component composed of plastic, and an armoring component disposed between these components, using the injection-molding technique. In this connection, the carrier component and the cover component are injected onto the armoring component in an injection-molding machine, one after the other. To implement the method, two possible injection-molding machine variants are proposed. In the first machine variant, the injection-molding machine comprises two mold mounting plates that can be moved relative to one another, with sub-tools mounted on them, and a turning unit disposed between the mold mounting plates, having a third sub-tool that can be rotated about an axis of rotation that extends transverse to the closing axis; a first cavity, which is delimited by the first and the third sub-tool, is used for injection-molding of the carrier component, while the cover component is injection-molded in a cavity delimited by the second and the third sub-tool. The intermediate product produced in the first step, consisting of the armoring component and the carrier component injection-molded onto it, is conveyed, after the tool is opened, adhering to the third sub-tool, by means of rotation of the latter, in front of the second sub-tool, before the tool is closed again for the second step. In the second machine variant, no turning unit is provided between the mold mounting plates that carry the first and the second sub-tool; instead, here one of the two mold mounting plates can be rotated about an axis of rotation parallel to the shooting axis. The different cavities are delimited, in each instance, by the first and the second sub-tool.

An injection-molding machine that corresponds to the second machine variant according to EP 1612024 A1, which serves, in the same manner, for producing a composite component having an insertion part around which injection-molding takes place on both sides, can also be derived from WO 2010/050101 A1.

WO 2009/143600 A1 discloses an injection-molding machine that corresponds, in terms of its fundamental construction, to that of the first machine variant according to EP 1612024 A1.

In various application areas, there is a need for plastic molded parts having an embedded barrier layer. This particularly holds true in the sector of foods packaging and (reclosable) containers, specifically when it is a matter of preventing the diffusion of oxygen into the interior of a plastic packaging in order to protect sensitive foods, or, in the case of technical substances, of preventing diffusion of volatile components out of the substance. Reference is made to the prior art, for example to WO 2010/139566 A1.

From cost aspects, a special challenge lies in being able to produce such plastic molded parts reliably and with process security, in which parts the barrier layer embedded in the plastic has only a minimal thickness.

SUMMARY

This problem is solved, according to the present invention, by the method indicated in the claims. In functional synergistic interaction with the other features characteristic for it, the method according to the invention is therefore particularly characterized in that the barrier layer that is to be embedded into the plastic to become part of the plastic molded part is at first—because it has been coated on both sides with plastic material—part of a three-dimensional preform that has proceeded from a multi-layer barrier film cutout, around which injection-molding takes place, using a multi-stage injection-molding process.

During the respective injection-molding step, the plastic melt injected into the tool connects with the coating material of the barrier film cutout, which has been melted or superficially melted, and in the end result, this leads to particularly strong and permanently reliable anchoring of the barrier layer in the injection-molded plastic molded part.

In this connection, the method works with a stable process, even in the case of extremely thin barrier layers (of the multi-layer barrier film). This is because, on the one hand, the barrier layer is supported and protected by the respective plastic coating material, so that it withstands the great stresses within the injection mold during the injection-molding process; on the other hand, as will be explained in greater detail below, large-area support of the preform in the injection mold can take place, specifically on the side that lies opposite the side on which plastic material is injected during the injection-molding step in question. It should be mentioned as a further important advantage of the present invention that extremely simple and reliable handling of the barrier layer to be processed occurs, because this layer is part of an—ideally inherently rigid—three-dimensional preform made from a barrier film cutout, at the time when it is placed into the injection mold. In typical applications, very advantageous conditions are present both with regard to process management (see above) and with regard to the properties of the end product, if the thickness of the two plastic coatings of the barrier layer amounts to between 10 times and 100 times the thickness of the barrier layer of the barrier film cutout (before its forming), in each instance.

Further advantages and advantageous aspects of the present invention will become evident from the further explanations, particularly of the various preferred exemplary embodiments explained below.

In this sense, a first particularly preferred further development of the present invention is characterized in that the preform is formed by means of thermoforming of a planar cutout of a multi-layer barrier film. In this connection, the said cutout can particularly be punched from the said multi-layer barrier film, but—depending on the specific special circumstances (for example the materials used and their thickness)—other methods (for example laser cutting or ultrasound punching) can also be used. For example, more or less bowl-like preforms can be produced by means of the said thermoforming; these can be used within the scope of producing containers that serve to hold foods, for example.

In this connection, the edges of the preform that proceeded from the cut edges of the cutout of multi-layer barrier film particularly preferably have material injection-molded around them. In this way, the barrier layer is completely encapsulated in the plastic molded part. It is not directly exposed to any kind of ambient influences and is mechanically protected. In this way, even a particularly thin barrier layer performs its function for a long time. Using the present invention, it is therefore possible to successfully use a barrier material that is significantly thinner and therefore less expensive than barrier material that is used within the scope of producing plastic molded parts using conventional injection-molding processes. Thus, for example, a film of EVOH having a thickness of only 5 to 10 µm can be used, if a PP/EVOH/PP three-layer barrier film formed to produce the said three-dimensional preform is used.

According to another preferred further development of the present invention, it is provided that the coating material and the injection-molding material are the same or come from the same material family. This promotes the permanently strong and long-lived material connection between the coating material and the injection-molding material by means of melting, with the result of a particularly long-lived plastic molded part.

If the process is managed appropriately, the multi-layer barrier film formed to produce the three-dimensional preform—particularly by means of thermoforming—can be further refined during the injection-molding process, in the sense of expanded functionality; for example, it can be provided with energy directors for ultrasound welding or with hinges or with seals or the like.

An injection-molding machine, which can be used to perform the method according to the invention, as explained above, in particularly reliable manner, is indicated in the claims. In synergistic functional interaction with the other features characteristic for it, the injection-molding machine according to the invention is therefore characterized, among other things, in that three sub-tools are provided, namely a first and a second sub-tool, each assigned to a mold mounting plate, and a third sub-tool disposed between them, which can rotate about an axis of rotation that extends parallel to the closing axis of the injection-molding machine and has a plurality of hollow spaces disposed around the axis of rotation. When the tool is closed, it has a plurality of mold cavities, which are each delimited by the first sub-tool, the second sub-tool, and the wall of the respective hollow space of the third sub-tool. It is particularly important, in this connection, that the hollow spaces of the third sub-tool are open both in the direction toward the first sub-tool and in the direction toward the second sub-tool, so that injection-molding material—depending on the respective method step—can be injected into the cavity both from the side of the first sub-tool and from the side of the second sub-tool. Within the injection-molding machine, the individual injection-molding steps proceed at different stations, and the molded part produced in the first injection-molding step, which, in the sense of the method explained above, can particularly consist of the three-dimensional preform with plastic injection-molded onto it, defining a wall surface of the plastic molded part to be produced, can be transported from one station to the next by means of the third sub-tool, by rotating the latter about its axis of rotation. In this connection, plastic is typically injection-molded onto the second side in the second station, so that there, too, a structure that defines the finished wall surface of the plastic molded part to be produced is produced.

Using the injection-molding machine as explained, the method according to the invention, as described above, for producing a plastic molded part, which has a barrier layer embedded in the plastic, can be carried out particularly efficiently.

It is particularly advantageous, in this connection, if at least one sub-tool has an accommodation for an insertion part around which injection-molding is to take place (particularly the preform composed of multi-layer barrier film explained above), and the geometry of the accommodation, in particular, can correspond, over a large area, to the geometry of the insertion part, so that the insertion part is supported by the accommodation over a large area, at least during one injection-molding step. This possibility stands in direct relationship with the multi-stage injection-molding process, which makes it possible that one side of the insertion part is supported over a large area, specifically the side on which no plastic is being applied during the injection-molding step in question. In this way, the risk of damage to the insertion part is very low, even in the case of highly dynamic injection-molding procedures with highly viscous melt. This in turn is a particularly essential aspect in view of the statement of task explained initially (minimizing the thickness of a barrier layer).

According to another preferred further development, the turning unit has a frame that surrounds the third sub-tool. This is decidedly advantageous with regard to the rigidity of the turning unit. In this connection, depending on the requirements concerning mold rigidity and/or rotatable mounting of the third sub-tool, the frame can be filled entirely or in part, but in view of the accessibility of the hollow spaces disposed in the third sub-tool from both sides, as explained above, a possible filling of the frame has perforations in a geometrical allocation to the individual injection-molding stations.

The present invention can be used equally for injection-molding machines having a fixed turning unit—with respect to the machine bed—and in injection-molding machines that have a fixed and a movable mold mounting plate, where in the latter case, corresponding to a particularly preferred further development of the present invention, the turning unit is also structured to be displaceable. In this connection, it is particularly preferred if the weight of the turning unit is passed directly into the stand of the injection-molding machine (machine bed) by way of suitable linear guides. Alternatively or additionally, the turning unit can be guided on crosspieces of the injection-molding machine.

BRIEF DESCRIPTION OF THE DRAWINGS

In the following, the present invention will be explained in greater detail using a particularly preferred exemplary embodiment illustrated in the drawing. The drawing shows.

DETAILED DESCRIPTION OF THE PREFERRED EMBODIMENTS

Figure 1:
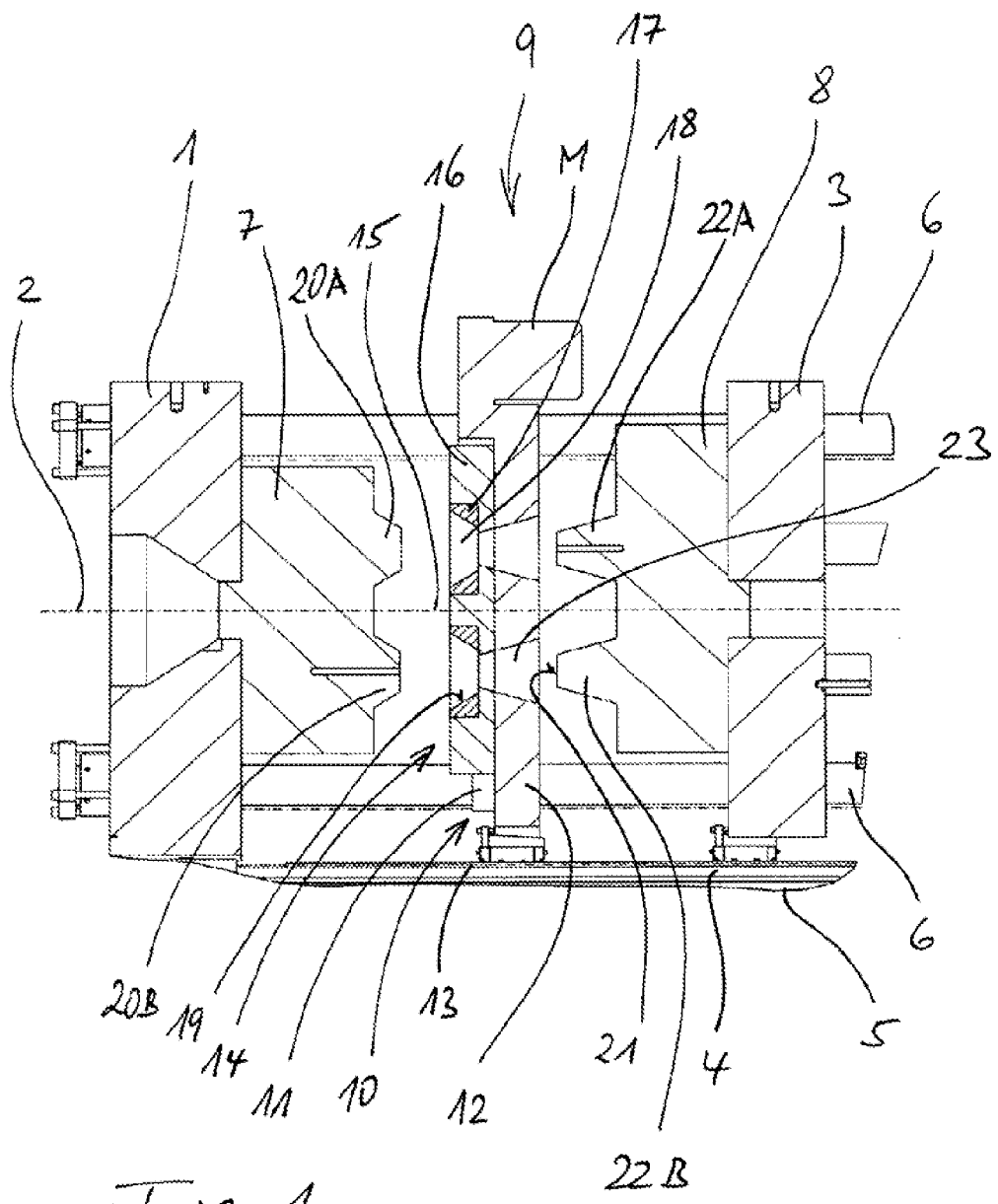
FIG. 1 as a detail, an axial section through an injection-molding machine structured according to the invention, with the tool open, and FIG. 2 the injection-molding machine according to FIG. 1 (with minimal modifications, which are not significant here), with the tool closed.

The injection-molding machine illustrated in the drawing, in the scope of a sole detail that is of interest here, corresponds to the sufficiently known state of the art, unless otherwise evident from the present description; it particularly has a first fixed mold mounting plate 1 and a second mold mounting plate 3 that can be displaced along the machine axis 2, the latter being supported on the machine stand (machine bed) 5 by way of linear guides 4. Crosspieces 6 extend between the two mold mounting plates. The closing unit and the two injection units, of which one is assigned to the first mold mounting plate 1 and the other to the second mold mounting plate 3, are not shown. A first sub-tool 7 is mounted on the first mold mounting plate 1, and a second sub-tool 8 is mounted on the second mold mounting plate 3. It does not appear to be necessary to explain this fundamental structure of the injection-molding machine in detail at this point; instead, reference is made, in this regard, to the general known state of the art.

A turning unit 9 is disposed between the two mold mounting plates 1 and 3. This unit comprises a basic structure 10 having a frame 11 and a filling 12 that reinforces the latter, with the basic structure being supported on the machine stand 5 so as to be displaceable by way of a linear guide 13. An additional guide of the basic structure 10 on the crosspieces 6 is also provided, if necessary.

A third sub-tool 14 is mounted on the basic structure 10, so as to rotate about the axis of rotation 15 that is parallel to the machine axis 2. The third sub-tool 14 comprises a disk-like rotation body 16 and mold inserts 17 accommodated in the latter. In this connection, the two mold inserts correspond identically with regard to the shaping of their surfaces 19 that define the respective hollow space 18.

When the tool is closed (FIG. 2), the hollow spaces 18, together with the first sub-tool 7 and the second sub-tool 8, delimit two cavities. These are structured differently, by means of different shaping of the projections 20 of the first sub-tool 7. Thus, the upper projection 20A, which is assigned to the upper injection-molding station A, is configured to be somewhat sturdier than the projection 20B assigned to the lower injection-molding station B. In this way, a three-dimensional preform laid into the cavity of the upper injection-molding station A, in which the first injection-molding step of the method explained above takes place, is supported over a large area by the projection 20A, which is adapted to the inside geometry of the bowl-like preformed preform, while plastic melt is injected into the cavity by means of the second sub-tool 8, in order to apply plastic to the outside of the preform. In this way, the projection 20A of the first sub-tool 7 forms an "accommodation" 24 in the sense explained above.

After solidification of the injected melt, the tool is opened (FIG. 1), and the third sub-tool 14 is rotated by 180°, with the injection-molded part produced in the injection station A remaining in the mold insert in question and thereby getting into the injection station B. After the tool is closed (FIG. 2), plastic melt is injected into the cavity of the lower injection station B through the first sub-tool 7, in order to apply plastic to the inside of the injection-molded part produced in the injection station A. In this connection, the injection-molded part in question is supported over a large area on the outside, specifically by the surface 19 of the hollow space 18 of the third sub-tool 14 in question, as well as by the face side 21 of the lower projection 22B of the second sub-tool 8 assigned to the second, lower injection station B.

For chargeability of the hollow spaces 18 of the third sub-tool 14—depending on the current position in the first injection station A or the second injection station B—through the second sub-tool 8 or, conversely, through the first sub-tool 7, the filling 12 of the basic structure 10 of the turning unit 9 has perforations 23—spatially assigned to the injection stations. The same holds true analogously for the turning body 16.

Figure 2:
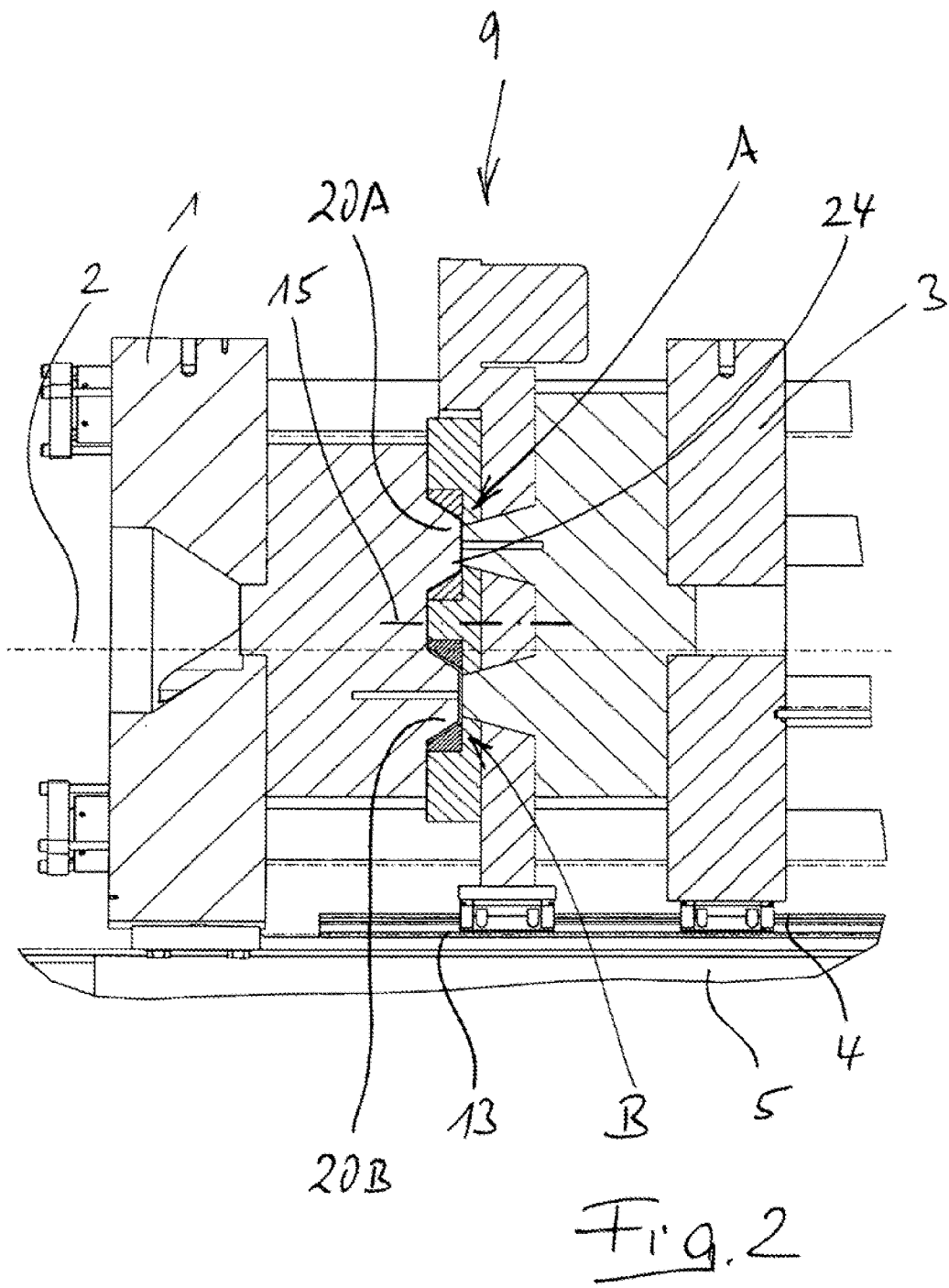

As a precaution, in order to prevent misunderstandings, it is pointed out once again that while the injection-molding machines according to the invention illustrated in FIGS. 1 and 2 are structured to be fundamentally the same, they differ in design details, for example with regard to the placement of the axis of rotation 15, the structure of the support of the turning unit 9, and of the displaceable mold mounting plate 3, as well as of the frame 11 of the basic body 10 of the turning unit 9, and the like.

What is claimed is:

1. An injection-molding machine comprising:
    two mold mounting plates (1, 3) that can be moved relative to one another,
    a closing unit,
    a turning unit (9) disposed between the mold mounting plates, and
    at least two injection units, wherein the two mold mounting plates carry a first and a second sub-tool (7, 8) and the turning unit comprises a third sub-tool (14), which can be rotated about an axis of rotation (15) oriented parallel to the closing axis (2) and comprises multiple hollow spaces (18), each hollow space having interconnected openings open both in the direction of the first sub-tool and in the direction of the second sub-tool and disposed around the axis of rotation and structured to be the same, which hollow spaces, when the tool is closed, delimit differently structured cavities together with both the first and the second sub-tool (7, 8), wherein the cavities delimited by the first, second, and third sub-tool (14) can be charged, in one position (A) of the third sub-tool, by an injection unit assigned to the first mold mounting plate (1), through the first sub-tool (7), and, in a different position (B) of the third sub-tool (14), by an injection unit assigned to the second mold mounting plate (3), through the second sub-tool (8).

2. The injection-molding machine of claim 1, wherein a sub-tool (7, 8, 14) has an accommodation for an insertion part around which injection-molding is to take place.

3. The injection-molding machine of claim 1, wherein the geometry of the accommodation corresponds, over a large area, to the geometry of the insertion part, so that the insertion part is supported by the accommodation over a large area.

4. The injection-molding machine of claim 1, wherein the turning unit (9) has a frame that surrounds the third sub-tool (14).

5. The injection-molding machine of claim 1, wherein one of the mold mounting plates (1, 3) is fixed in place, and the turning unit (9) is structured to be displaceable along the closing axis (2).

6. The injection-molding machine of claim 1, wherein the turning unit (9) is supported on the stand (5) of the injection-molding machine by way of linear guides (13).

7. The injection-molding machine of claim 1, wherein the turning unit (9) is guided on crosspieces (6) of the injection-molding machine.

8. The injection-molding machine of claim 1, wherein the turning unit is fixed with respect to the machine bed.

* * * * *